US010579776B1

(12) United States Patent
Selvidge et al.

(10) Patent No.: US 10,579,776 B1
(45) Date of Patent: Mar. 3, 2020

(54) SELECTIVE CONDITIONAL STALL FOR HARDWARE-BASED CIRCUIT DESIGN VERIFICATION

(71) Applicant: Mentor Graphics Corporation, Wilsonville, OR (US)

(72) Inventors: Charles W. Selvidge, Oakland, CA (US); Ansuman Prusty, Edison, NJ (US); Vipul Kulshrestha, Lexington, MA (US); Kenneth W. Crouch, Cambridge, MA (US); Matthew L. Dahl, Cambridge, MA (US); Laurent Vuillemin, Montigny le Bretonneux (FR)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/174,382

(22) Filed: Oct. 30, 2018

Related U.S. Application Data

(60) Provisional application No. 62/579,134, filed on Oct. 30, 2017.

(51) Int. Cl.
 *G06F 17/50* (2006.01)
(52) U.S. Cl.
 CPC ...... *G06F 17/5081* (2013.01); *G06F 17/5054* (2013.01); *G06F 2217/84* (2013.01)
(58) Field of Classification Search
 CPC ............. G06F 17/5081; G06F 17/5054; G06F 2217/84
 USPC ........................................................ 716/113
 See application file for complete search history.

(56) References Cited

U.S. PATENT DOCUMENTS

| 6,591,360 | B1* | 7/2003 | Soltis, Jr. | G06F 9/3824 712/219 |
| 10,068,041 | B2* | 9/2018 | Elrabaa | G06F 17/5022 |
| 2017/0062075 | A1* | 3/2017 | Barber | G11C 29/12015 |
| 2017/0220719 | A1* | 8/2017 | Elrabaa | G06F 17/5022 |
| 2019/0094298 | A1* | 3/2019 | Kusko | G01R 31/3177 |
| 2019/0258765 | A1* | 8/2019 | Darbari | G06F 17/5031 |

OTHER PUBLICATIONS

Zulkifli et al., Reduced Stall MIPS Architecture using Pre-Fetching Accelerator, International Conference on Electrical Engineering and Informatics, Aug. 2009, pp. 611-616 (Year: 2009).*
Burch et al., Sequential Circuit Verification Using Symbolic Model Checking, 27th ACM/IEEE Design Automation Conference, 1990, pp. 46-51 (Year: 1990).*

* cited by examiner

*Primary Examiner* — Suresh Memula

(57) ABSTRACT

Various aspects of the present disclosed technology relate to techniques for selective conditional stall for speeding up hardware-based circuit verification. A path-breaking circuit device is inserted into a location of a design path configured to generate a stall signal indicating whether a change of signal between a pair of neighboring clock cycles of a clock signal is detected at the location. The stall signal is used to directly or indirectly suppress, when the change of signal between the pair of neighboring clock cycles is detected, the next state updating for state element models in the hardware model of circuit design. The design path is usually the critical design path. The insertion location is usually selected to be a location where the signal does not change frequently.

22 Claims, 10 Drawing Sheets

SELECTIVE CONDITIONAL STALL FOR HARDWARE-BASED CIRCUIT DESIGN VERIFICATION

RELATED APPLICATIONS

This application claims the benefit of U.S. Provisional Patent Application No. 62/579,134, filed on Oct. 30, 2017, titled "Selective Conditional Stall For Hardware-Based Circuit Design Verification," and naming Charles W. Selvidge et al. as inventors, which application is incorporated entirely herein by reference.

FIELD OF THE DISCLOSED TECHNOLOGY

The present disclosed technology relates to the field of circuit design verification. Various implementations of the disclosed technology may be particularly useful for speeding up hardware-based verification.

BACKGROUND OF THE DISCLOSED TECHNOLOGY

Electronic circuits, such as integrated circuits, are used in a variety of products, from automobiles to smart phones to personal computers. Designing and fabricating these circuit devices typically involves many steps, known as a "design flow." The particular steps of a design flow often are dependent upon the type of integrated circuit being designed, its complexity, the design team, and the integrated circuit fabricator or foundry that will manufacture the circuit. Typically, software and hardware "tools" will verify a design at various stages of the design flow by running software simulators and/or hardware emulators/prototyping devices. The verification processes then are used to identify and correct errors in the design.

Several steps are common to most design flows. Typically, the specification for the new circuit initially is described at a very abstract level as a logical design. An example of this type of abstract description is a register transfer level (RTL) description of the circuit. With this type of description, the circuit is defined in terms of both the exchange of signals between hardware registers and the logical operations that are performed on those signals. A register transfer level design typically employs a Hardware Description Language (HDL) (sometimes also referred to as hardware design language or hardware definition language), such as the Very high speed integrated circuit Hardware Description Language (VHDL) or the Verilog language. The logic of the circuit is then analyzed, to confirm that the logic incorporated into the design will accurately perform the functions desired for the circuit. This analysis is sometimes referred to as "functional verification."

Logic simulation is a tool used for functional verification. Designing hardware today involves writing a program in the hardware description language. A simulation may be performed by running that program on a computer. Such an electronic design simulator can determine what the various states of an electronic design would be when presented with some input stimulus. Simulators are commercially available such as the QUESTA family of simulators from Mentor Graphics Corporations of Wilsonville, Oreg.

Software-based simulation, however, may be too slow for large complex designs such as SoC (System-on-Chip) designs. The speed of execution of a simulator drops significantly as the design size increases due to cache misses and memory swapping. Emulation and prototyping significantly increase verification productivity by employing reconfigurable hardware modeling devices including emulators and prototyping devices. Field programmable gate arrays (FPGAs)-based emulators and prototyping devices rely on an actual silicon implementation and perform circuit verification generally in parallel as the circuit design will execute in a real device. By contrast, a simulator performs circuit verification by executing the hardware description code serially. The different styles of execution can lead to orders of magnitude differences in execution time. Examples of hardware emulators include the VELOCE family of emulators available from Mentor Graphics Corporation of Wilsonville, Oreg., the ZEBU family of emulators available from Synopsys, Inc. of Mountain View, Calif., and the PALLADIUM family of emulators available from Cadence Design Systems of San Jose, Calif.

While reconfigurable hardware modeling device-based emulation and prototyping are faster than simulation, further speeding up the verification process is still highly desirable. An emulator typically has a clock rate of several megahertz. The design clock of a circuit model often operates at a slower speed due to various limitations. One major limitation is the existence of long design paths in many circuit designs. It is advantages to increase the clock frequency of the circuit model by overcoming the challenge of long design paths.

BRIEF SUMMARY OF THE DISCLOSED TECHNOLOGY

Various aspects of the present disclosed technology relate to techniques for selective conditional stall for speeding up hardware-based circuit verification. In one aspect, there is a system, comprising: a reconfigurable hardware modeling device programmed to implement a hardware model of a circuit design, the hardware model of the circuit design comprising: a path-breaking circuit device being inserted into a location of a design path to divide a whole or a portion of the design path into two segments, the path-breaking circuit device being configured to generate a stall signal indicating whether a change of signal between a pair of neighboring clock cycles of a clock signal is detected at the location of the design path; and state element models for some or all of state elements in the circuit design, wherein the stall signal is used to directly or indirectly suppress, when the change of signal between the pair of neighboring clock cycles is detected at the location of the design path, a next state updating for the state element models, the next state updating immediately following a state updating for the state element models performed during the pair of neighboring clock cycles.

The hardware model of the circuit design may further comprise: clock circuitry configured to generate another clock signal based on the clock signal and the stall signal, the another clock signal being used as a clock signal for the state element models, wherein the next state updating for the state element models is suppressed when a clock pulse of the another clock signal is suppressed by the stall signal.

Each of the state element models may comprise enable signal circuitry having an enable signal input and the stall signal is directly or indirectly coupled to the enable signal input for the enable signal circuitry to control whether to suppress the next state updating for the state element models.

The path-breaking circuit device may comprise a state element or a state element model, the state element or the state element model being inserted into the location of the design path and being clocked by the clock signal. The path-breaking circuit device may further comprise an XOR gate or an XOR gate model, inputs of the XOR gate or the XOR gate model being coupled to an input and an output of the state element or the state element model, respectively.

The hardware model of the circuit design may further comprise: another path-breaking circuit device being inserted into another location of the design path, the another path-breaking circuit device and the path-breaking circuit device together dividing the whole or the portion of the design path into three segments, the another path-breaking circuit device being configured to generate another stall signal indicating whether a change of signal between either the pair of neighboring clock cycles or another pair of neighboring clock cycles is detected at the another location of the design path, wherein the last clock cycle in the pair of neighboring clock cycles is a first clock cycle in the another pair of neighboring clock cycles, and wherein a combination of the stall signal and the another stall signal directly or indirectly suppresses: a) both the next state updating and a state updating immediately following the next state updating for the state element models when both the change of signal between the pair of neighboring clock cycles at the location of the design path and the change of signal between the another pair of neighboring clock cycles at the another location of the design path are detected, and b) the next state updating for the state element models when the change of signal between the pair of neighboring clock cycles is detected at either the location of the design path or the another location of the design path.

The hardware model of the circuit design may further comprise: one or more path-breaking circuit devices being inserted into one or more design paths, respectively and configured to generate one or more stall signals, each of the one or more path-breaking circuit devices dividing a portion or a whole of one of the one or more design paths into two segments, wherein a combination of the stall signal with the one or more stall signals directly or indirectly suppresses the next state updating for the state element models when the change of signal between the pair of neighboring clock cycles is detected by at least one of the path-breaking circuit device and the one or more path-breaking circuit devices. The circuitry hardware models may still further comprise: circuitry configured to generate a global stall signal based on the stall signal and the one or more stall signals.

The reconfigurable hardware modeling device may be a hardware-based emulator or an FPGA-based prototyping device.

The hardware model of the circuit design may further comprise: circuitry configured to block or not to block both a stall signal output and a design signal output from the path-breaking circuit device based on a signal generated by the hardware model of the circuit design.

The location for inserting the path-breaking device may be selected based at least in part on how frequent the change of signal happens.

In another aspect, there is one or more non-transitory computer-readable media storing computer-executable instructions for causing one or more processors to generate bitstreams for programming a reconfigurable hardware modeling device to implement the above hardware model of the circuit design.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Figure 1A:
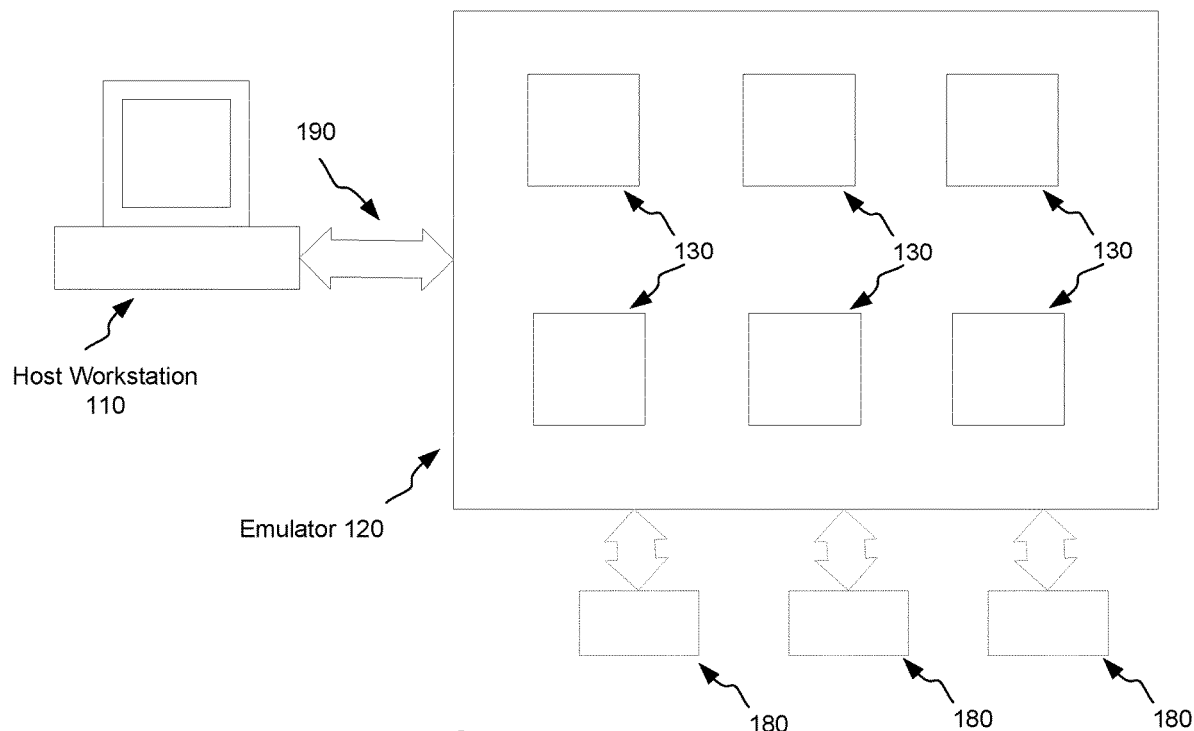
FIG. 1A shows an illustrative example of an emulation system with an emulator being coupled to targets.

Various aspects of the present disclosed technology relate to techniques for selective conditional stall for speeding up hardware-based circuit verification. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "insert", "configure" and "suppress" to describe the disclosed methods/systems. Such terms are high-level descriptions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Hardware Modeling Environment

Reconfigurable hardware modeling devices can be emulators or prototyping devices.

Two types of emulators have been developed. The first type is FPGA-based. In an FPGA-based architecture, each FPGA chip has a network of prewired blocks of look-up tables and coupled flip-flops. A look-up table can be programmed to be a Boolean function, and each of the look-up tables can be programmed to connect or bypass the associated flip-flop(s). Look-up tables with connected flip-flops act as finite-state machines, while look-up tables with bypassed flip-flops operate as combinational logic. The look-up tables can be programmed to mimic any combinational logic of a predetermined number of inputs and outputs. To emulate a circuit design, the circuit design is first compiled and mapped to an array of interconnected FPGA chips. The compiler usually needs to partition the circuit design into pieces (sub-circuits) such that each fits into an FPGA chip. The sub-circuits are then synthesized into the look-up tables (that is, generating the contents in the look-up tables such that the look-up tables together produce the function of the sub-circuits). Subsequently, place and route are performed on the FPGA chips in a way that preserves the connectivity in the original circuit design.

The programmable logic chips employed by an emulator may be commercial FPGA chips or custom-designed emulation chips containing programmable logic blocks. A custom FPGA-based emulator can have a specially designed internal interconnection network of programmable elements within each custom FPGA, an external interconnecting network and I/O structure of custom FPGAs, and a design-under-test debug engine. Such architecture enables, compared to a commercial FPGA-based counterpart, fast and correct-by-construction compilation and high design visibility in the silicon fabric that assumes 100% access without probe compilation and rapid waveform tracing. A commercial FPGA chip may have somewhat larger capacity density than a custom FPGA chip. For a given design, a custom FPGA-based emulator may need more FPGAs than a commercial FPGA-based emulator, leading to larger physical dimensions and higher power consumption.

The second type of emulators is processor-based: an array of Boolean processors able to share data with one another is employed to map a circuit design, and Boolean operations are scheduled and performed accordingly. Similar to the FPGA-based, the circuit design needs to be partitioned into sub-circuits first so that the code for each sub-circuit fits the instruction memory of a processor. The compilation speed of a processor-based emulator, however, is much faster than those of a FPGA-based emulator. Drawbacks are limited speed of execution in a transaction-based mode, large power consumption, and large physical dimensions compared to a FPGA-based emulator.

An emulator may operate in various modes. In an in-circuit emulation mode, the emulator is connected with a user's target system to form a prototype of the system the user is designing. The emulator typically replaces the circuit being designed for the target system, allowing system-level and software testing prior to silicon availability. Although an emulator may run up to six orders of magnitude faster than a simulator, it is often not fast enough to run at the same speed of the physical target system (a few megahertz vs hundreds of megahertz). Speed rate adapters may be introduced between the target system and the emulator. A rate adapter behaves like a buffer. It caches the signal activity from the design-under-test (DUT) at emulation speed and sends it at real-time speed to the target system. Conversely, it captures the signal activity from the target system at full speed, caches it, and then sends it back to the DUT at emulation speed. Even when a rate adapter is available, the constant evolution of speed and complexity of individual I/O protocols may make timely rate adapter development difficult.

In an acceleration mode, the physical target system is replaced by a virtual target system modelled via one of the high-level languages such as SystemVerilog, SystemC, or C++. The acceleration mode leverages the existing simulation testbench and removes the need for external rate adapters. The testbench creates test vectors and check corresponding responses of the circuit model. In addition to the elimination of speed adapters, the acceleration mode has advantages such as no hardware dependencies, the ability to use the emulator remotely, and the ability to run verification of corner cases.

The acceleration mode can be cycle-based or transaction-based. The cycle-based acceleration mode employs a signal-level or bit-level interface connecting the testbench processed by the host workstation to the design mode on the emulator. Each and every transition on each and every interface signal must be transferred between the testbench and the design model at the slow speed of the testbench simulated in the workstation. As a result, the speed of the emulator is wasted waiting to carry out these signal transfers.

The transaction-based acceleration reduces the traffic between workstation and emulator by replacing bit-by-bit exchanges with transaction exchanges. Data exchange is through so-called transactors. A transactor, including a front-end proxy interface on the workstation or host computer, a back-end bus-functional model on the emulator and a physical communication channel between the host computer and the emulator, converts high-level commands from the testbench on the host computer into signal-level bit sequences required by the design-under-test model on the emulator, and vice versa. This allows data being streamed and buffered between the testbench and the design-under-test, speeding up the execution of the testbench. A design team can thus access the full performance of the emulator. In addition to performance, the transaction-based emulation eliminates the need for rate adapters. The design-under-test can connect to a "virtual device" (a software model of the device) that runs on the host computer through a transaction-level interface or to a physical device through a transaction-level interface and a "virtual device" acting as a bridging device.

In addition to emulators, reconfigurable hardware modeling devices also include FPGA prototyping devices. FPGA prototyping is typically deployed near the end of the verification process to catch system-level issues. For designs that rely heavily on commercial intellectual property (IP), an FPGA-based prototype is an ideal test platform for ensuring all IP components perform together. An FPGA-based prototype can also serve as a vehicle for software development and validation. Embedded software has become the dominant part of the effort in modern System-on-Chip (SoC) design. FPGA prototyping provides software developers early access to a fully functioning hardware platform well before real silicon. This enables early software development tasks such as operating system (OS) integration and application testing. The increased productivity of software development and validation greatly accelerates a product's time-to-market.

Compared to FPGA-based emulators which typically operate at one to two million cycles per second, FPGA prototypes are designed and built to achieve the highest speed of execution possible, allowing the extension of the speed range into tens of megahertz. The downside to FPGA prototyping is capacity limitations, limited debugging capabilities and long bring-up time. With growing complexity of FPGAs and advancement in both emulation and prototyping technologies, the lines between FPGA-based prototyping and emulation are increasingly blurring.

In some embodiments, the disclosed technology may be implemented as part of a hardware emulation environment, such as the one illustrated in FIG. 1A. As seen in this figure, the hardware emulation environment includes an emulator 120 coupled to a host computer or workstation 110. The workstation 110 may be implemented by one or more computing systems. One computing system may include a single computer or multiple computers (e.g., a master computer and a plurality of slave computers). The workstation provides the capability to load the DUV (design-under-verification, also referred to as DUT—design under test) model into the emulator, controls the execution of the DUT model on the emulator over time, and serves as a debugging interface into the DUV model on the emulator. As discussed previously, the workstation may include the testbench and perhaps other software models in some of the operational modes.

The emulator 120 includes multiple printed circuit boards (emulation circuit boards) 130. These emulation circuit boards 130 are networked (not shown). A circuit design may be partitioned by the workstation 110 and loaded to the emulation circuit boards 130 for emulation.

In the in-circuit emulation mode, one or more targets 180 may be coupled to the emulator 120 as shown in FIG. 1A. In some simple environments, a target may be a piece of test equipment that generates and verifies test data such as a network tester. In other environments, the target can be the actual circuitry with which the DUT model will interact in its final application (e.g., other hardware components of the system for which the DUT model is designed). A target can be either a static target or a dynamic target, depending on whether design clock signals run in the emulator can be suspended or not.

Figure 1B:
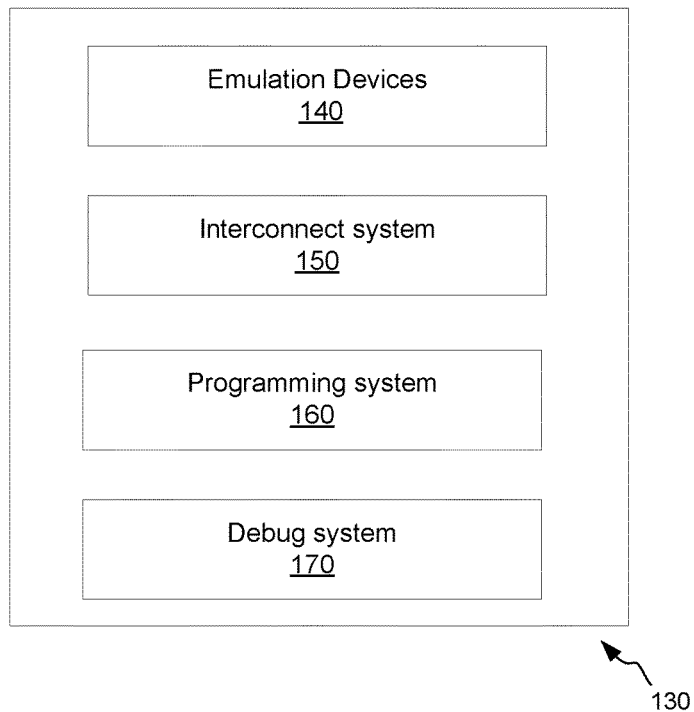
FIG. 1B shows an illustrative example of an emulation circuit board.

FIG. 1B illustrates an example of an emulation circuit board 130. The emulation circuit board 130 includes an array of emulation devices 140. The emulation devices 140 can be programmed to model, for example, combinatorial logic components, sequential circuit components and memories. The emulation devices 140 may be processor-based or FPGA-based.

Also included in the emulation circuit board 130 are a configurable interconnect system 150, a programming system 160, and a debug system 170. A portion of a circuit design on one emulation device may need data computed by another portion of the design on another emulation device. The configurable interconnect system 150 allows data to be moved between emulation devices 140. In some implementations, the configurable interconnect system 150 may include a cross-bar device, a multiplexer, some other configurable network, or any combination thereof.

The programming system 160 enables a variety of other types of data to be brought in or out from an emulation device 140. Examples include programming data to configure an emulation device to perform a particular function, visibility data collected from the debug system 170 to be brought to the host workstation 110 for display, and content data either read from or written to memory circuitry in an emulation device 140.

The debug system 170 enables the emulation system to monitor the behavior of a modeled circuit design. Needed data for visibility viewing purposes can be stored in the debug system 170. The debug system 170 may also provide resources for detecting specific conditions occurring in the circuit design. Such condition detection is sometimes referred to as triggering.

The emulator 120 is coupled to the host workstation 110 through an interface system 190. The interface system 190 comprises one or more interfaces. A typical interface is optimized to transport large amounts of data such as data containing the emulated circuit design model (e.g., FPGA configuration bitstreams), initial contents of registers and design memories and data for debugging purposes. This interface is independent of design-under-test and may comprise dedicated logic or programmed logic in the emulator.

The interface system may also comprise one or more transaction-level interfaces. These interfaces may be optimized for small packets of data and fast streaming speed. The speed may be, for example, in the order of 2-3 Gigabits per second. The communication is performed through transactors as discussed previously. A transactor includes a back-end bus-functional model—instrumented logic in the emulator model, which requires the emulator infrastructure clock keep running even though the design clocks can be stopped.

It should also be appreciated that the emulation system in FIG. 1A and the emulation circuit board 130 in FIG. 1B are illustrated as examples only, and they are not intended to be limiting. Various embodiments of the disclosed technology may be implemented using only a subset of the components illustrated in the figures, or include an alternate combination of components, including components that are not shown in the figures.

Illustrative Computer-Based Operating Environment

Figure 2:
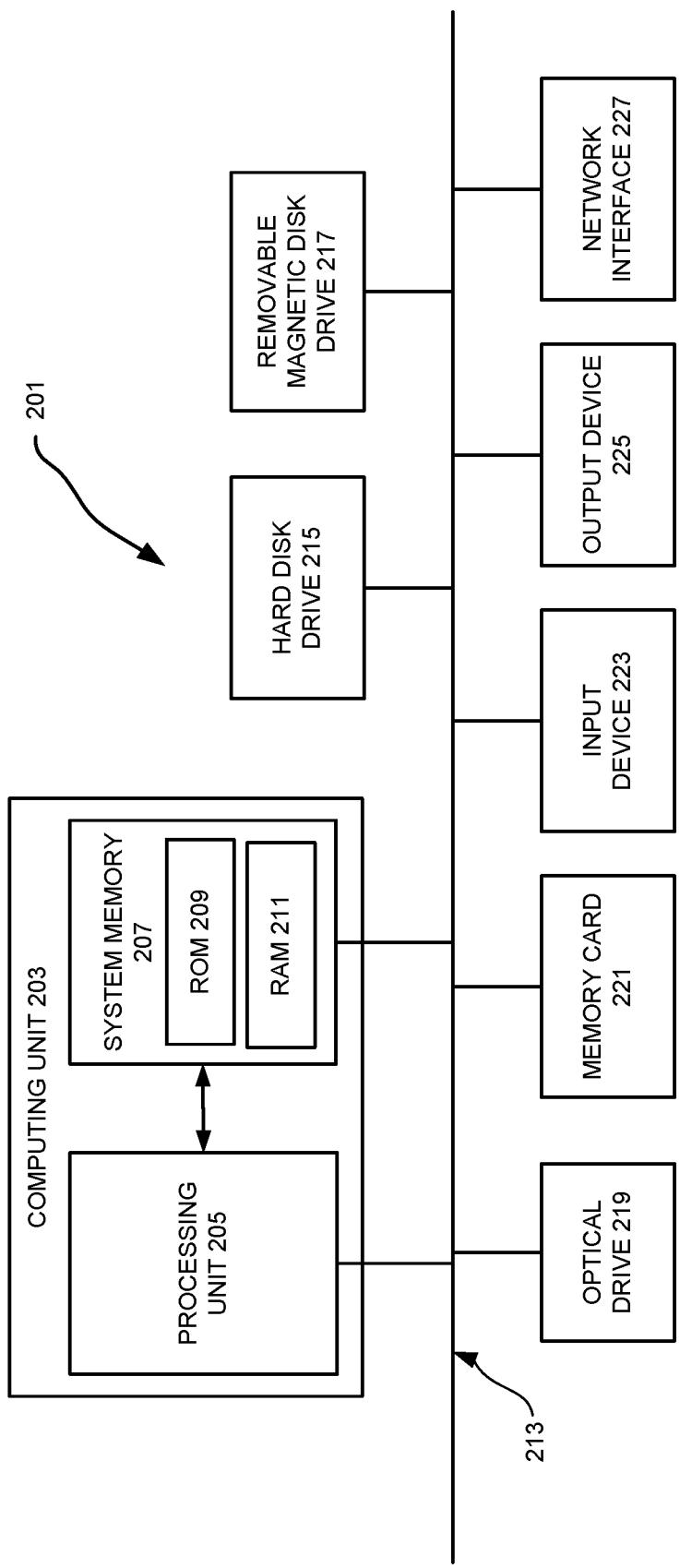
FIG. 2 illustrates a programmable computer system which various embodiments of the disclosed technology may employ.

FIG. 2 shows an illustrative example of a computing device 201 which may serve as the workstation 110 and/or implement various embodiments of a part or whole of the disclosed technology. As seen in this figure, the computing device 201 includes a computing unit 203 with a processing unit 205 and a system memory 207. The processing unit 205 may be any type of programmable electronic device for executing software instructions, but will conventionally be a microprocessor. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure, to one or more peripheral devices. For example, the processing unit 205 or the system memory 207 may be directly or indirectly connected to one or more additional memory storage devices, such as a "hard" magnetic disk drive 215, a removable magnetic disk drive 217, an optical disk drive 219, or a flash memory card 221. The processing unit 205 and the system memory 207 also may be directly or indirectly connected to one or more input devices 223 and one or more output devices 225. The input devices 223 may include, for example, a keyboard, a pointing device (such as a mouse, touchpad, stylus, trackball, or joystick), a scanner, a camera, and a microphone. The output devices 225 may include, for example, a monitor display, a printer and speakers. With various examples of the computer 201, one or more of the peripheral devices 215-225 may be internally housed with the computing unit 203. Alternately, one or more of the peripheral devices 215-225 may be external to the housing for the computing unit 203 and connected to the bus 213 through, for example, a Universal Serial Bus (USB) connection.

With some implementations, the computing unit 203 may be directly or indirectly connected to one or more network interfaces 227 for communicating with other devices making up a network. The network interface 227 translates data and control signals from the computing unit 203 into network messages according to one or more communication protocols, such as the transmission control protocol (TCP) and the Internet protocol (IP). Also, the interface 227 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 201 is illustrated as an example only, and it not intended to be limiting. Various embodiments of the disclosed technology may be implemented using one or more computing devices that include the components of the computer 201 illustrated in FIG. 2, which include only a subset of the components illustrated in FIG. 2, or which include an alternate combination of components, including components that are not shown in FIG. 2. For example, various embodiments of the disclosed technology may be implemented using a multiprocessor computer, a plurality of single and/or multiprocessor computers arranged into a network, or some combination of both.

Selective Suppression of State Updating for Speeding Up Verification

Figure 3:
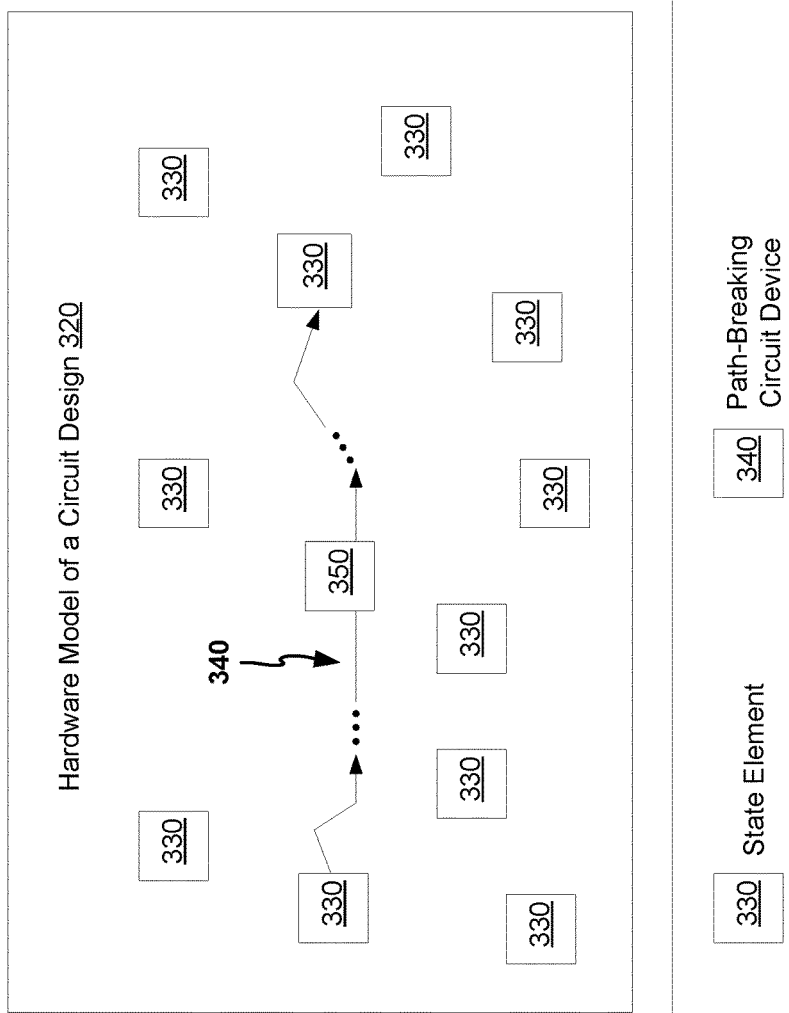
FIG. 3 illustrates an example of a reconfigurable hardware modeling device according to various embodiments of the disclosed technology.

FIG. 3 illustrates an example of a reconfigurable hardware modeling device 310 according to various embodiments of the disclosed technology. The reconfigurable hardware modeling device 310 comprises a hardware model of a circuit design 320. The hardware model of the circuit design 320 comprises state element models 330, a design path 340 connecting two of the state element models 330, and a path-breaking circuit device 350. The path-breaking circuit device 350 is inserted into the design path 340, dividing it into two segments. Here, a design path is a signal propagation path in a circuit design. A design path typically starts from an output of a first state element or an input of the circuit design, passes through logic gates, and ends at an input of a second state element or an output of the circuit design. In FIG. 3, the design path 340 starts from the state element model 330 on the left and ends at the state element model 330 on the right, indicated by the arrows. It should be noted that the figure is for illustration only. The hardware model of the circuit design 320 can have much more state elements and design paths than those shown in the figure. Some large circuit designs can have up to tens of millions of state elements.

A state element is a circuit component that is capable of storing a value. State elements can be used to control the flow of signals between combination logic circuits. A state element can be triggered to replace the stored value with the value present at its input. The process is referred to as a state updating. A particular edge or level of a clock input signal for the state element, for example, can serve as the trigger for the state element to perform a state updating. Examples of state elements include latches and flip-flops. Multiple flip-flops can be combined to form a multi-bit state element called a register.

Figure 4:
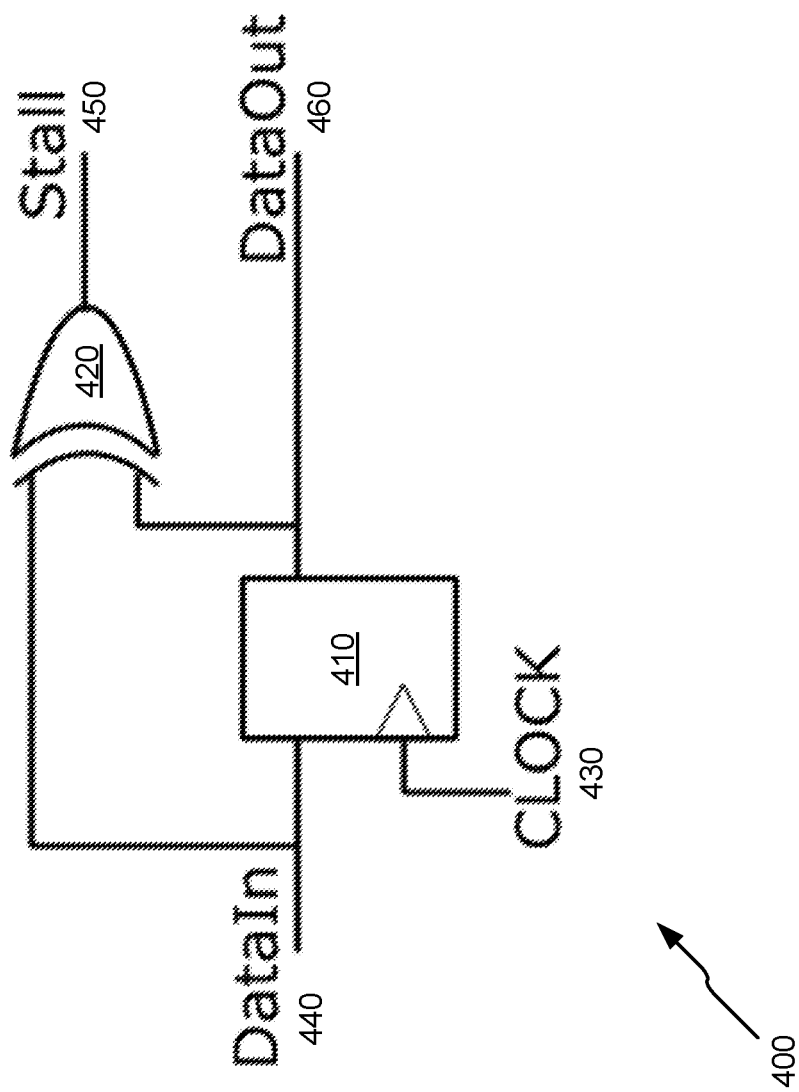
FIG. 4 illustrates an example of a block diagram of a path-breaking circuit device according to some embodiments of the disclosed technology.

The path-breaking circuit device 350 is configured to generate a stall signal which indicates whether there is a change of signal between a pair of neighboring clock cycles of a clock signal at the location of the design path 340 where the path-breaking circuit device 350 is inserted. FIG. 4 illustrates an example of a block diagram of a path-breaking circuit device 400 that can be employed to detect the change and to generate the stall signal according to some embodiments of the disclosed technology. The path-breaking circuit device 400 comprises a flip-flop 410 and an XOR (Exclusive OR) gate 420. The flip-flop 410 is directly inserted into the design path. The flip-flop 410 is edge-triggered by a clock signal 430. Thus, the design path signal existed before a clock edge of a clock signal 430 can be stored by the flip-flop 410 as its DataOut signal 460. The signal propagated through the design path after the clock edge of the clock signal 430 is present as a DataIn signal 440 of the flip-flop 410, which will not replace the DataOut signal 460 until the arrival of the clock edge of the next clock cycle. Therefore, the DataIn signal 440 and the DataOut signal 460 represent signals at the insertion location of the design path belong to two neighboring clock cycles. The XOR gate 420 compares these two signals and outputs the result as a Stall signal 450. The Stall signal 450 is zero when there is no signal change at the location of the design path where the flip-flop 410 is inserted and is one when it has a signal change. Accordingly, the Stall signal 450 can serve as the stall signal described above.

Figure 5:
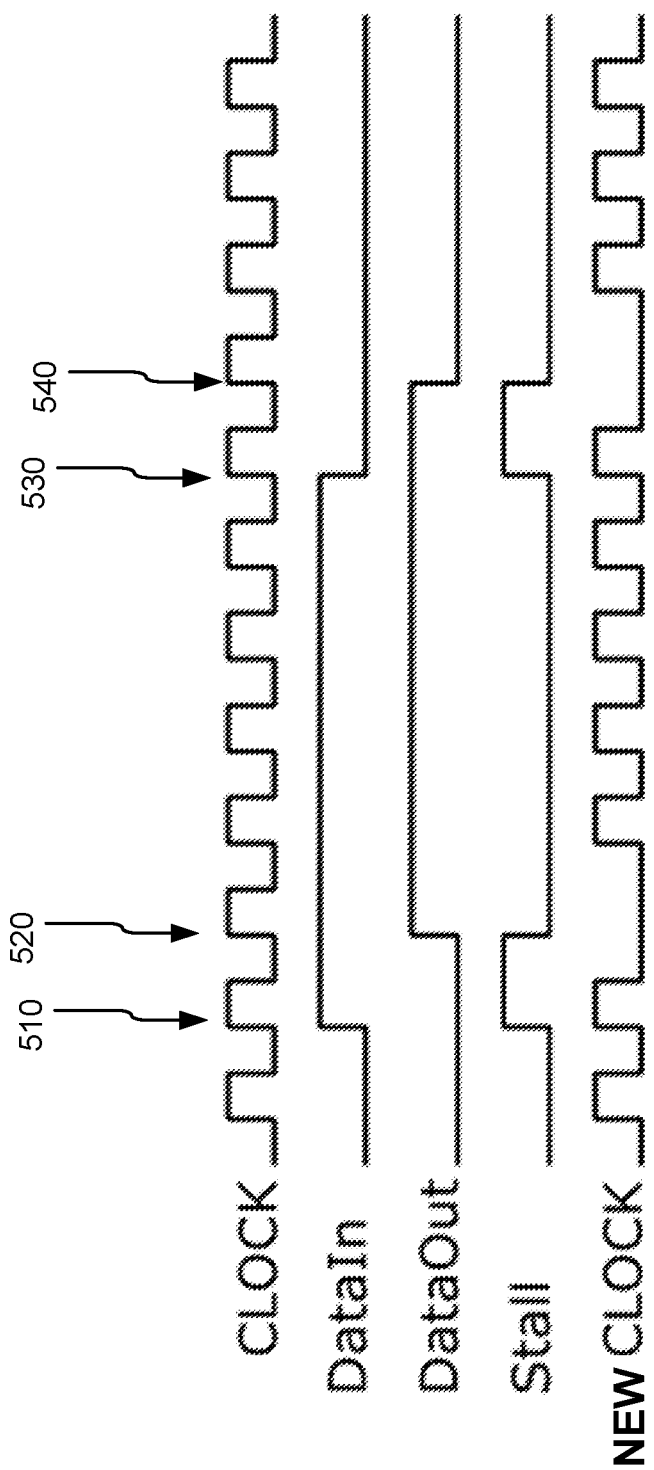
FIG. 5 illustrates an example of signal waveforms for the path-breaking circuit device shown in FIG. 4 according to some embodiments of the disclosed technology.

FIG. 5 illustrates an example of signal waveforms for the path-breaking circuit device 400 according to some embodiments of the disclosed technology. Before a clock edge 510 of the CLOCK signal 430, both the DataIn signal 440 and the DataOut signal 460 stay at zero and thus the Stall signal 450 is also zero. After the clock edge 510 of the CLOCK signal 430, the DataIn signal 440 changes to one, causing the Stall signal 450 to change to one as well. A clock edge 520 of the next clock cycle triggers the flip-flop 410 to change its state (state updating) and thus the DataOut signal 460 becomes one after the clock edge 520. Because both the DataIn signal 440 and the DataOut signal 460 are the same now, the Stall signal 450 returns to zero and a clock pulse is thus formed between the two clock edges 510 and 520. Similarly, the Stall signal 450 generates another pulse between two clock edges 530 and 540 when the DataIn signal 440 and the DataOut signal 460 return to zero in succession during a pair of consecutive clock cycles, corresponding to another change of signal at the location of the design path.

The stall signal generated by a path-breaking circuit device can be employed to suppress directly or indirectly the next state updating for the state element models when a change of signal between a pair of neighboring clock cycles is detected. Here, the next state updating is the one immediately following the one taking place during the pair of neighboring clock cycles. One approach for the state updating suppression is to generate another clock signal from the original clock signal based on the stall signal to clock the state element models. The original clock signal is still used to clock the path-breaking circuit device. FIG. 5 illustrates an example of a waveform for such a new clock signal (indicated as NEW CLOCK). In the figure, the two pulses of the Stall signal 450 suppress two clock edges of the NEW CLOCK signal corresponding to the clock edges 520 and 540. As such, two corresponding pulses in the NEW CLOCK signal disappear. If this new clock signal is used to drive clock inputs of the state element models 330 in the hardware model of the circuit design 320 shown in FIG. 3, there will be no state updating for these state element models 330 at the two clock edges 520 and 540 or the corresponding clock pulses of the original clock signal (the CLOCK signal 430).

Selective suppressing state updating for the state element models can "shorten" a design path of the hardware model of a circuit design while maintaining the functionality of the circuit design. Shortening the longest design path can allow the hardware model of the circuit design to operate at a higher clock frequency. The longest design path means that the delay in signal propagation is the longest. The longest design path is sometimes referred to as a critical design path as it limits the design clock frequency.

Assume the design path 340 is the longest design path. Due to inserting the path-breaking circuit device 350 and clocking the state element models 330 by the new clock signal, there is no need to compute signal propagation from the insertion location to the end of the design path 340 when no signal change takes place at the insertion location between a pair of neighboring clock cycles of the original clock signal. Only a single clock pulse is needed for the path evaluation and this critical design path effectively becomes "non-critical". Being non-critical is only temporary because two clock pulses are needed to propagate a signal from the start of the design path 340 to the end of the design path 340 when there is a signal change at the insertion location. However, the critical design path is indeed "shortened", and the hardware model of the circuit design 320 can thus operate at a higher clock frequency. While more clock pulses are needed from time to time due to occasional signal changes at the insertion location, the number of these additional clock pulses can be limited to a small number by carefully choosing the insertion location. For example, one of the selection criteria can be searching for a location where the change of signal is not frequent during the circuit operation being emulated. In doing so, the overall effect can be a significant improvement on the emulation speed.

Figure 6:
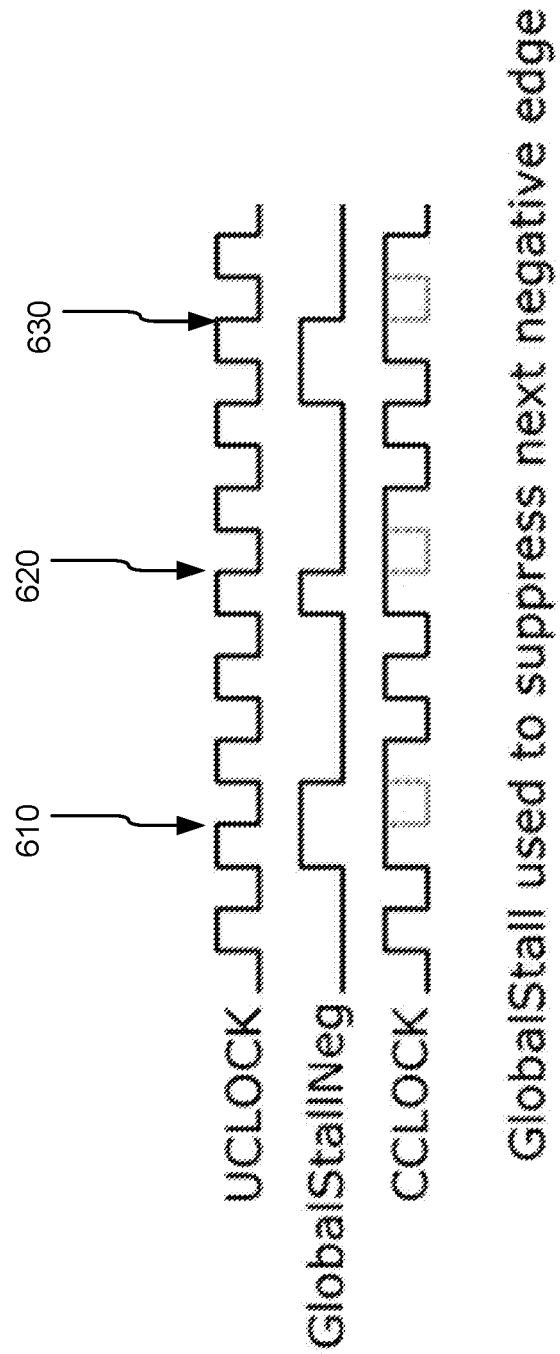
FIG. 6 illustrates an example of signal waveforms for suppressing next negative clock edges which some embodiments of the disclosed technology may employ.

In the example illustrates in FIG. 5, positive clock edges of the NEW CLOCK signal corresponding to the clock edges 520 and 540 of the CLOCK signal 430 are suppressed. The timing behavior of some logic may be sensitive to negative edges of a clock signal. Various embodiments of the disclosed technology can additionally or alternatively suppress next negative edges, as illustrated in FIG. 6. In the figure, negative clock edges of a CCLOCK signal corresponding to clock edges 610, 620 and 630 of a UCLOCK signal are suppressed by three pulses of a GlobalStallNeg signal.

In addition to generating a new clock signal based on the stall signal to clock the state element models, many other approaches can be employed to suppress a state updating for the state element models. For example, the stall signal can be coupled directly or indirectly to the enable-input to control whether to prevent the next state updating for the state element models. This is because a state updating of a state element can happen only if the state element is "enabled" by the enable signal. If the stall signal is present at the enable input of a state element, the state element can perform state updating operations only during certain time periods dictated by the stall signal. Some state elements in a circuit design may have an enable input, and the state element models for them typically have a corresponding one. For state elements that do not have an enable input, the disclosed technology can insert enable signal circuitry along with an enable input into each of the state element models corresponding to these state elements for selective conditional stall of state updating operations.

Figure 7:
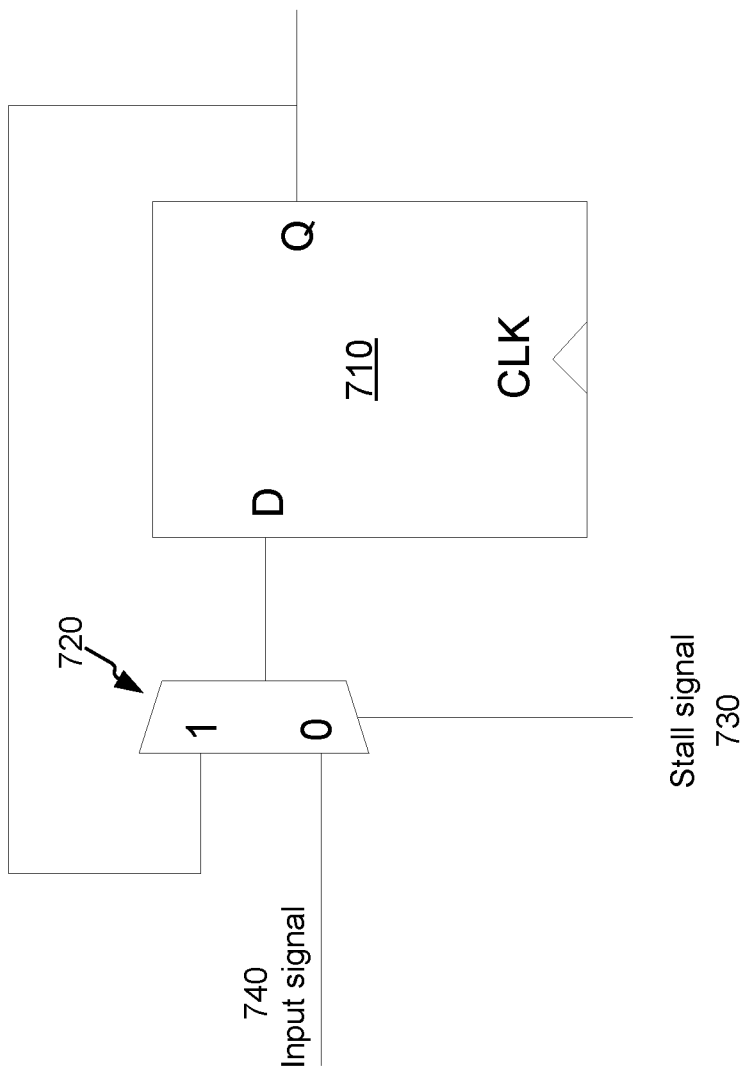
FIG. 7 illustrates an example of a feedback structure for selectively preventing a state element from updating its state which some embodiments of the disclosed technology may employ.

A state updating for a state element model can also be suppressed by using a feedback structure. An example of such a feedback structure is illustrated in FIG. 7. In the feedback structure, a two-to-one multiplexer 720 is added in front of a D input of a state element 710. A stall signal 730 controls which signal, an input signal 740 from a signal path or a Q output signal of the state element 710, will be output to the D input of the state element 710. If the Q output signal of the state element 710 is selected, the state element 710 will keep the same output and a state updating for the state element 710 will effectively be suppressed.

It should be appreciated that various state updating suppression approaches can be inclusive. Some of the state element models may use one state updating suppression approach while some other of the state element models may use a different one.

Figure 8:
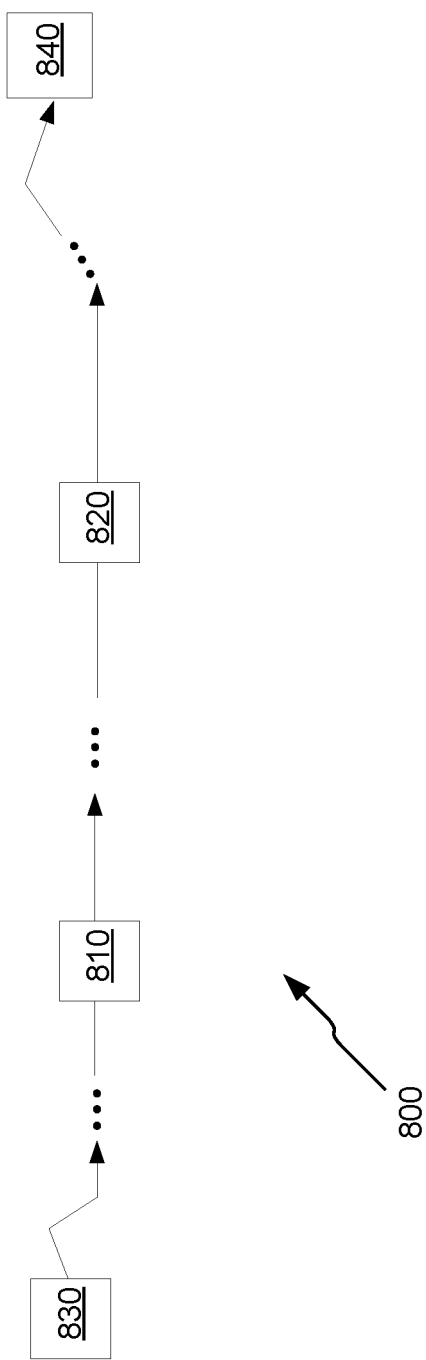
FIG. 8 illustrates an example of inserting two path-breaking circuit devices into a single design path.

According to various embodiments of the disclosed technology, a hardware model of a circuit design can have more than one path-breaking circuit devices. FIG. 8 illustrates an example in which two path-breaking circuit devices 810 and 820 are inserted into a design path 800 between two state elements 830 and 840. The path-breaking circuit devices 810 and 820 break the design path 800 into three segments and can generate two stall signals. When a change of signal between a pair of neighboring clock cycles is detected by either the path-breaking circuit device 810 or the path-breaking circuit device 820, a state updating for state element models immediately following the state updating for state element models performed during the pair of neighboring clock cycles will be suppressed. When a change of signal between a pair of neighboring clock cycles detected is detected by the path-breaking circuit device 810 and a change of signal between another pair of neighboring clock cycles (the last clock cycle in the pair of neighboring clock cycles is the first clock cycle in the another pair of neighboring clock cycles) is detected by the path-breaking circuit device 820, the next two state updating operations for state element models immediately following the state updating for state element models performed during the pair of neighboring clock cycles will be suppressed. The two stall signals can be merged together into a combined stall signal for suppressing state updating for the state element models.

It should be noted that more than two path-breaking circuit devices can be inserted into a single design path for the selective conditional stall.

Further, more than one design path in a hardware model of a circuit design can be divided into segments by the path-breaking circuit devices. A combination of the stall signals can directly or indirectly suppress a state updating for the state element models immediately following a state updating for the state element models performed during a pair of neighboring clock cycles when a change of signal between the pair of neighboring clock cycles is detected by at least one of the path-breaking circuit devices. Here, the stall signals can be combined into a global stall signal.

The hardware model of the circuit design can comprise a global reduction logic configured to "OR" together all the local stall signals from the path-breaking circuit devices to broadcast this computed value to the state element models to suppress state update in the stall cycles.

Alternatively, the hardware model of the circuit design may "OR" together all the locally available stall signals and then propagate a single locallyReducedStall signal to other parts of the design for next stage of reduction. Multiple such stages can be inserted depending upon the size of the design and desired amount of localization appropriate for the target architecture of the functional verification engine.

Each local region can compute a GlobaStall signal for its own local use by computing an OR operation of all the locally available local stall signals and broadcasting it to every other region. Further, each local region computes its own copy of GlobalStall by an OR operation of locallyReducedStall from other region and its own copy of locallyReducedStall. As such, if a stall is generated locally, the GlobalStall computation does not involve a path of first globally reducing the stall signals and then getting it back its own use. Instead, it becomes locally computed signal and thus is faster.

Figure 9:
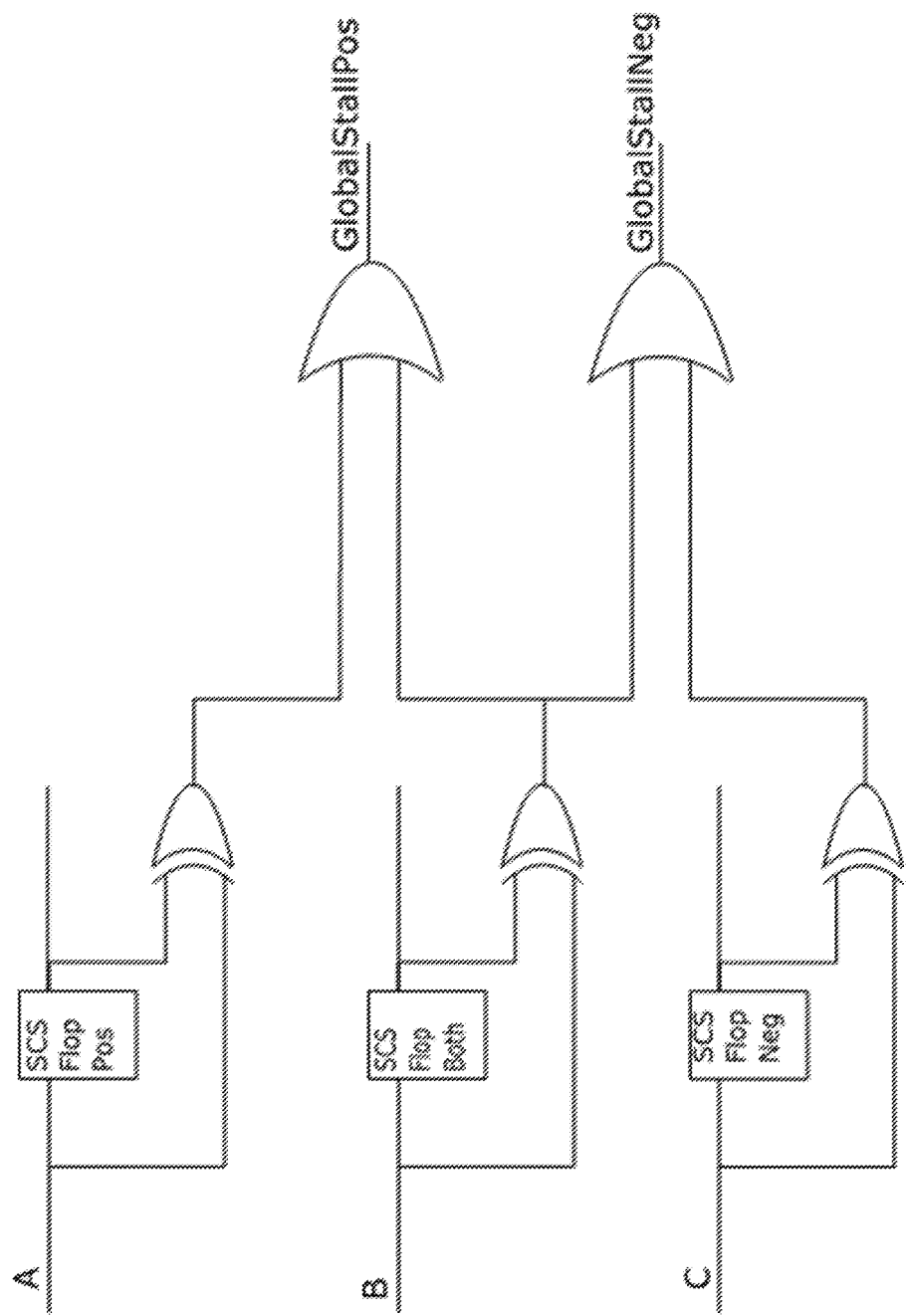
FIG. 9 illustrates an example of circuitry for generating two global stall signals to suppress positive clock edge or negative clock or both the clock edges.

FIG. 9 illustrates an example of circuitry for generating two global stall signals to suppress positive clock edge or negative clock or both the clock edges. In the figure, "A" represents a set of all nets whose destinations are only sensitive to the positive clock edge; "B" represents a set of all nets whose destinations are sensitive to both the clock edges and their source is also sensitive to both the clock edges; and "C" represents a set of all nets whose destinations are sensitive to only the negative clock edge.

Figure 10:
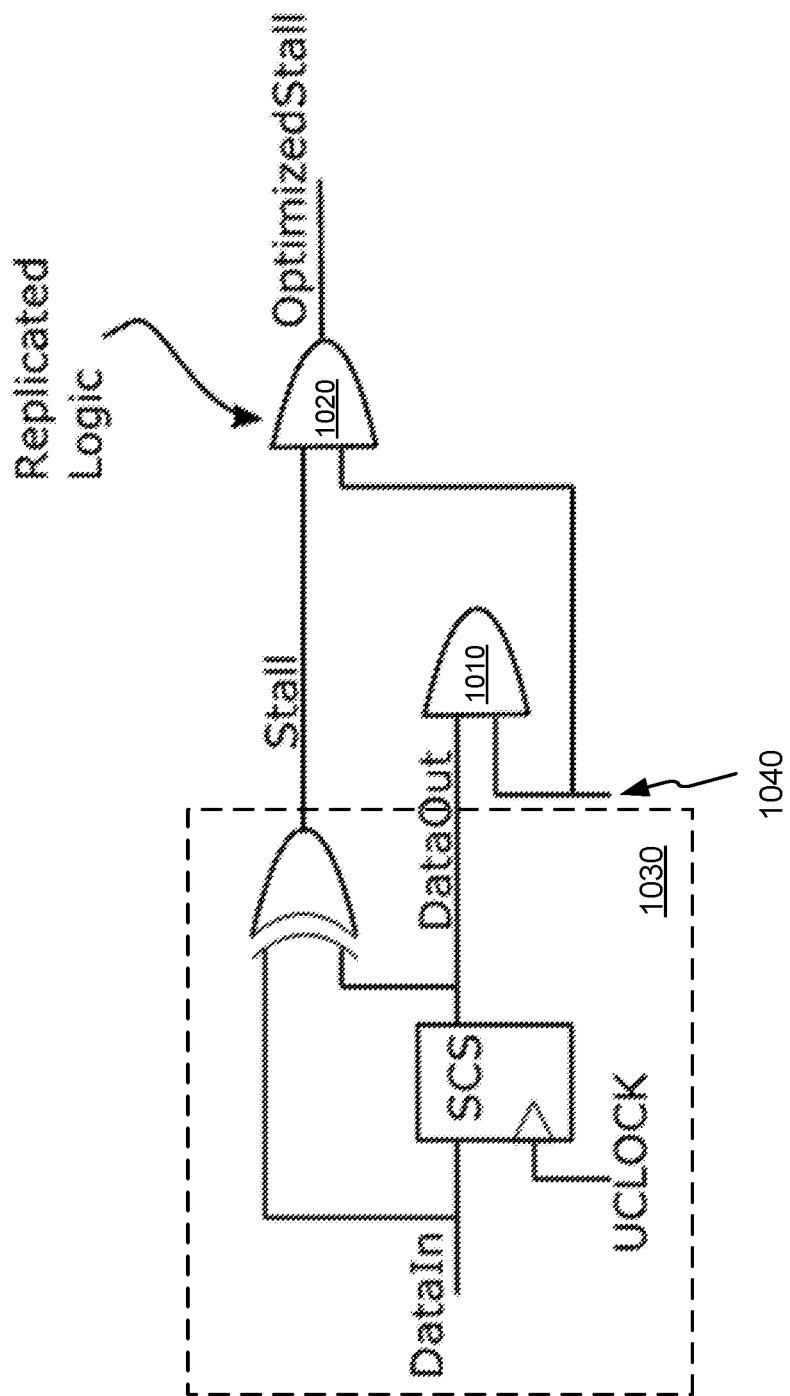
FIG. 10 illustrates an example of suppressing the stall generation according to some embodiments of the disclosed technology.

Even if there is a change of signal, sometimes a stall pulse need not be generated. This can be accomplished by filtering the output of a path-breaking circuit device when it reaches some logic gate to prevent its further propagation. FIG. 10 illustrates an example of suppressing the stall generation. In the circuit design being verified, an AND gate 1010 is behind the location where a path-breaking circuit device 1030 is inserted. That is, one of the inputs of the AND gate 1010 is coupled to the DataOut output of the AND gate 1020. The other input of the AND gate 1010 is a signal 1040. When the signal 1040 is 0, the design path is blocked at this location. In this scenario, the stall signal should be blocked accordingly. To achieve it, an AND gate 1020 is placed at the Stall output of a path-breaking circuit device 1030 and controlled by the same signal 1040. FIG. 10 is for illustration only. More complex logic gates can be used for the purpose as well.

A path-breaking circuit device can be inserted in many places in a hardware model of a circuit design while keeping functionality of the circuit design. As discussed previously, inserting it on a design net that changes very frequently can be undesirable because every change on the net would lead to a stall of 1 clock cycle and thereby degrade the design run throughput. On the other hand, insertion of path-breaking circuit devices strategically can improve the overall design run throughput effectively. If the longest design path of the design is reduced by a factor of 2, while ensuring that the number of stall cycles are only increased by 10%, leads to a throughput increase by 45%. To achieve this result, more than one design path may need to be divided by inserting the path-breaking circuit device. After the longest design path is "shortened," the second longest design path or more paths may also need to be divided to achieve the throughput increase by 45% because these design paths may be longer than the half length of the longest design path.

In addition to a reconfigurable hardware modeling device such as the one shown in FIG. 3, the disclosed technology can include a software tool that can cause one or more processors to generate bitstreams for programming a reconfigurable hardware modeling device to implement circuitry hardware models shown in FIG. 3. The software tool can be stored on one or more non-transitory computer-readable media. The term "non-transitory computer-readable medium" refers to computer-readable medium that are capable of storing data for future retrieval and not propagating electro-magnetic waves. The non-transitory computer-readable medium may be, for example, a magnetic storage device, an optical storage device, or a solid state storage device. The one or more processors may be part of a computer system such as the one shown in FIG. 2.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. One or more non-transitory computer-readable media storing computer-executable instructions for causing one or more processors to generate bitstreams for programming a reconfigurable hardware modeling device to implement circuitry hardware models, the circuitry hardware models comprising:
   a hardware model of a circuit design, the hardware model of the circuit design comprising:
      a path-breaking circuit device being inserted into a location of a design path to divide a whole or a portion of the design path into two segments, the path-breaking circuit device being configured to generate a stall signal indicating whether a change of signal between a pair of neighboring clock cycles of a clock signal is detected at the location of the design path; and
   state element models for some or all of state elements in the circuit design,
      wherein the stall signal is used to directly or indirectly suppress, when the change of signal between the pair of neighboring clock cycles is detected at the location of the design path, a next state updating for the state element models, the next state updating immediately following a state updating for the state element models performed during the pair of neighboring clock cycles.

2. The one or more non-transitory computer-readable media recited in claim 1, wherein the hardware model of the circuit design further comprises:
   clock circuitry configured to generate another clock signal based on the clock signal and the stall signal, the another clock signal being used as a clock signal for the state element models,
   wherein the next state updating for the state element models is suppressed when a clock pulse of the another clock signal is suppressed by the stall signal.

3. The one or more non-transitory computer-readable media recited in claim 1, wherein each of the state element models comprises enable signal circuitry having an enable signal input and the stall signal is directly or indirectly coupled to the enable signal input for the enable signal circuitry to control whether to suppress the next state updating for the state element models.

4. The one or more non-transitory computer-readable media recited in claim 1, wherein the path-breaking circuit device comprises a state element or a state element model, the state element or the state element model being inserted into the location of the design path and being clocked by the clock signal.

5. The one or more non-transitory computer-readable media recited in claim 4, wherein the path-breaking circuit device further comprises an XOR gate or an XOR gate model, inputs of the XOR gate or the XOR gate model being coupled to an input and an output of the state element or the state element model, respectively.

6. The one or more non-transitory computer-readable media recited in claim 1, wherein the hardware model of the circuit design further comprises:
   another path-breaking circuit device being inserted into another location of the design path, the another path-breaking circuit device and the path-breaking circuit device together dividing the whole or the portion of the design path into three segments, the another path-breaking circuit device being configured to generate another stall signal indicating whether a change of signal between either the pair of neighboring clock cycles or another pair of neighboring clock cycles is detected at the another location of the design path,
   wherein the last clock cycle in the pair of neighboring clock cycles is a first clock cycle in the another pair of neighboring clock cycles, and
   wherein a combination of the stall signal and the another stall signal directly or indirectly suppresses:
   a) both the next state updating and a state updating immediately following the next state updating for the state element models when both the change of signal between the pair of neighboring clock cycles at the location of the design path and the change of signal between the another pair of neighboring clock cycles at the another location of the design path are detected, and
   b) the next state updating for the state element models when the change of signal between the pair of neighboring clock cycles is detected at either the location of the design path or the another location of the design path.

7. The one or more non-transitory computer-readable media recited in claim 1, wherein the hardware model of the circuit design further comprises:
   one or more path-breaking circuit devices being inserted into one or more design paths, respectively and configured to generate one or more stall signals, each of the one or more path-breaking circuit devices dividing a portion or a whole of one of the one or more design paths into two segments,
   wherein a combination of the stall signal with the one or more stall signals directly or indirectly suppresses the next state updating for the state element models when the change of signal between the pair of neighboring clock cycles is detected by at least one of the path-breaking circuit device and the one or more path-breaking circuit devices.

8. The one or more non-transitory computer-readable media recited in claim 7, wherein the circuitry hardware models further comprises:
   circuitry configured to generate a global stall signal based on the stall signal and the one or more stall signals.

9. The one or more non-transitory computer-readable media recited in claim 1, wherein the reconfigurable hardware modeling device is a hardware-based emulator or an FPGA-based prototyping device.

10. The one or more non-transitory computer-readable media recited in claim 1, wherein the hardware model of the circuit design further comprises
    circuitry configured to block or not to block both a stall signal output and a design signal output from the path-breaking circuit device based on a signal generated by the hardware model of the circuit design.

11. The one or more non-transitory computer-readable media recited in claim 1, wherein the location is selected based at least in part on how frequent the change of signal happens.

12. A reconfigurable hardware modeling device programmed to implement circuitry hardware models, the circuitry hardware models comprising:
    a hardware model of a circuit design, the hardware model of the circuit design comprising:
    a path-breaking circuit device being inserted into a location of a design path to divide a whole or a portion of the design path into two segments, the path-breaking circuit device being configured to generate a stall signal indicating whether a change of signal between a pair of neighboring clock cycles of a clock signal is detected at the location of the design path; and
    state element models for some or all of state elements in the circuit design,
    wherein the stall signal is used to directly or indirectly suppress, when the change of signal between the pair of neighboring clock cycles is detected at the location of the design path, a next state updating for the state element models, the next state updating immediately following a state updating for the state element models performed during the pair of neighboring clock cycles.

13. The reconfigurable hardware modeling device recited in claim 12, wherein the hardware model of the circuit design further comprises:
    clock circuitry configured to generate another clock signal based on the clock signal and the stall signal, the another clock signal being used as a clock signal for the state element models,
    wherein the next state updating for the state element models is suppressed when a clock pulse of the another clock signal is suppressed by the stall signal.

14. The reconfigurable hardware modeling device recited in claim 12, wherein each of the state element models comprises enable signal circuitry having an enable signal input and the stall signal is directly or indirectly coupled to the enable signal input for the enable signal circuitry to control whether to suppress the next state updating for the state element models.

15. The reconfigurable hardware modeling device recited in claim 12, wherein the path-breaking circuit device comprises a state element or a state element model, the state element or the state element model being inserted into the location of the design path and being clocked by the clock signal.

16. The reconfigurable hardware modeling device recited in claim 15, wherein the path-breaking circuit device further comprises an XOR gate or an XOR gate model, inputs of the XOR gate or the XOR gate model being coupled to an input and an output of the state element or the state element model, respectively.

17. The reconfigurable hardware modeling device recited in claim 12, wherein the hardware model of the circuit design further comprises:
another path-breaking circuit device being inserted into another location of the design path, the another path-breaking circuit device and the path-breaking circuit device together dividing the whole or the portion of the design path into three segments, the another path-breaking circuit device being configured to generate another stall signal indicating whether a change of signal between either the pair of neighboring clock cycles or another pair of neighboring clock cycles is detected at the another location of the design path,
wherein the last clock cycle in the pair of neighboring clock cycles is a first clock cycle in the another pair of neighboring clock cycles, and
wherein a combination of the stall signal and the another stall signal directly or indirectly suppresses:
a) both the next state updating and a state updating immediately following the next state updating for the state element models when both the change of signal between the pair of neighboring clock cycles at the location of the design path and the change of signal between the another pair of neighboring clock cycles at the another location of the design path are detected, and
b) the next state updating for the state element models when the change of signal between the pair of neighboring clock cycles is detected at either the location of the design path or the another location of the design path.

18. The reconfigurable hardware modeling device recited in claim 12, wherein the hardware model of the circuit design further comprises:
one or more path-breaking circuit devices being inserted into one or more design paths, respectively and configured to generate one or more stall signals, each of the one or more path-breaking circuit devices dividing a portion or a whole of one of the one or more design paths into two segments,
wherein a combination of the stall signal with the one or more stall signals directly or indirectly suppresses the next state updating for the state element models when the change of signal between the pair of neighboring clock cycles is detected by at least one of the path-breaking circuit device and the one or more path-breaking circuit devices.

19. The reconfigurable hardware modeling device recited in claim 18, wherein the circuitry hardware models further comprises:
circuitry configured to generate a global stall signal based on the stall signal and the one or more stall signals.

20. The reconfigurable hardware modeling device recited in claim 12, wherein the reconfigurable hardware modeling device is a hardware-based emulator or an FPGA-based prototyping device.

21. The reconfigurable hardware modeling device recited in claim 12, wherein the hardware model of the circuit design further comprises
circuitry configured to block or not to block both a stall signal output and a design signal output from the path-breaking circuit device based on a signal generated by the hardware model of the circuit design.

22. The reconfigurable hardware modeling device recited in claim 12, wherein the location is selected based at least in part on how frequent the change of signal happens.

* * * * *